F. HOLAN.
GRIP TREAD FOR VEHICLE WHEELS.
APPLICATION FILED FEB. 2, 1909.
937,528.
Patented Oct. 19, 1909.
2 SHEETS—SHEET 1.
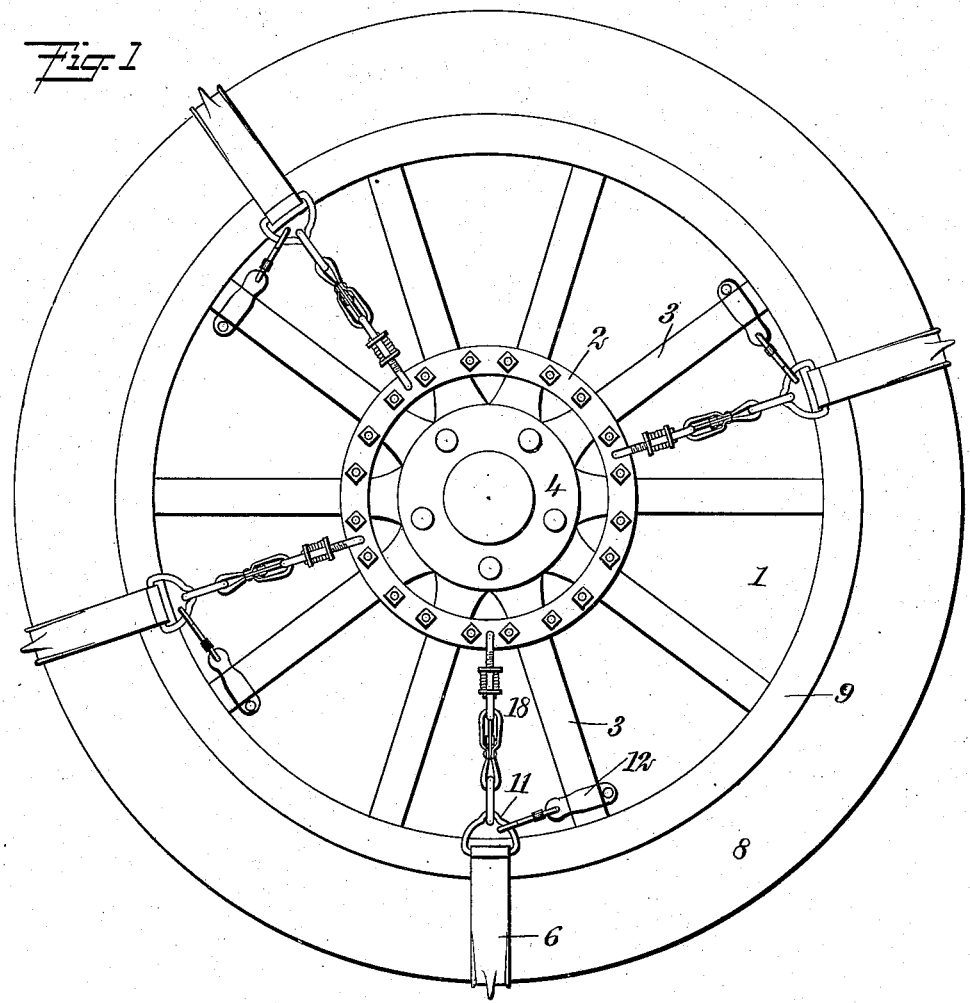
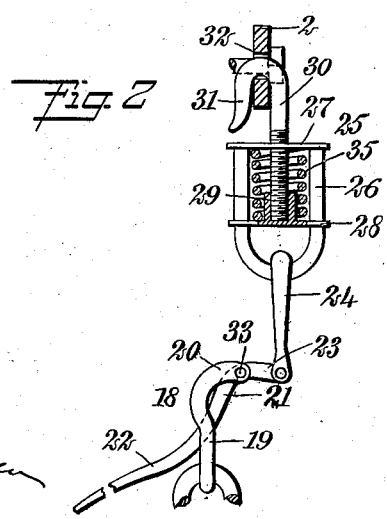
WITNESSES
INVENTOR
Frank Holan
BY Munn & Co.
ATTORNEYS F. HOLAN.
GRIP TREAD FOR VEHICLE WHEELS.
APPLICATION FILED FEB. 2, 1909.
937,528.
Patented Oct. 19, 1909.
2 SHEETS—SHEET 2.
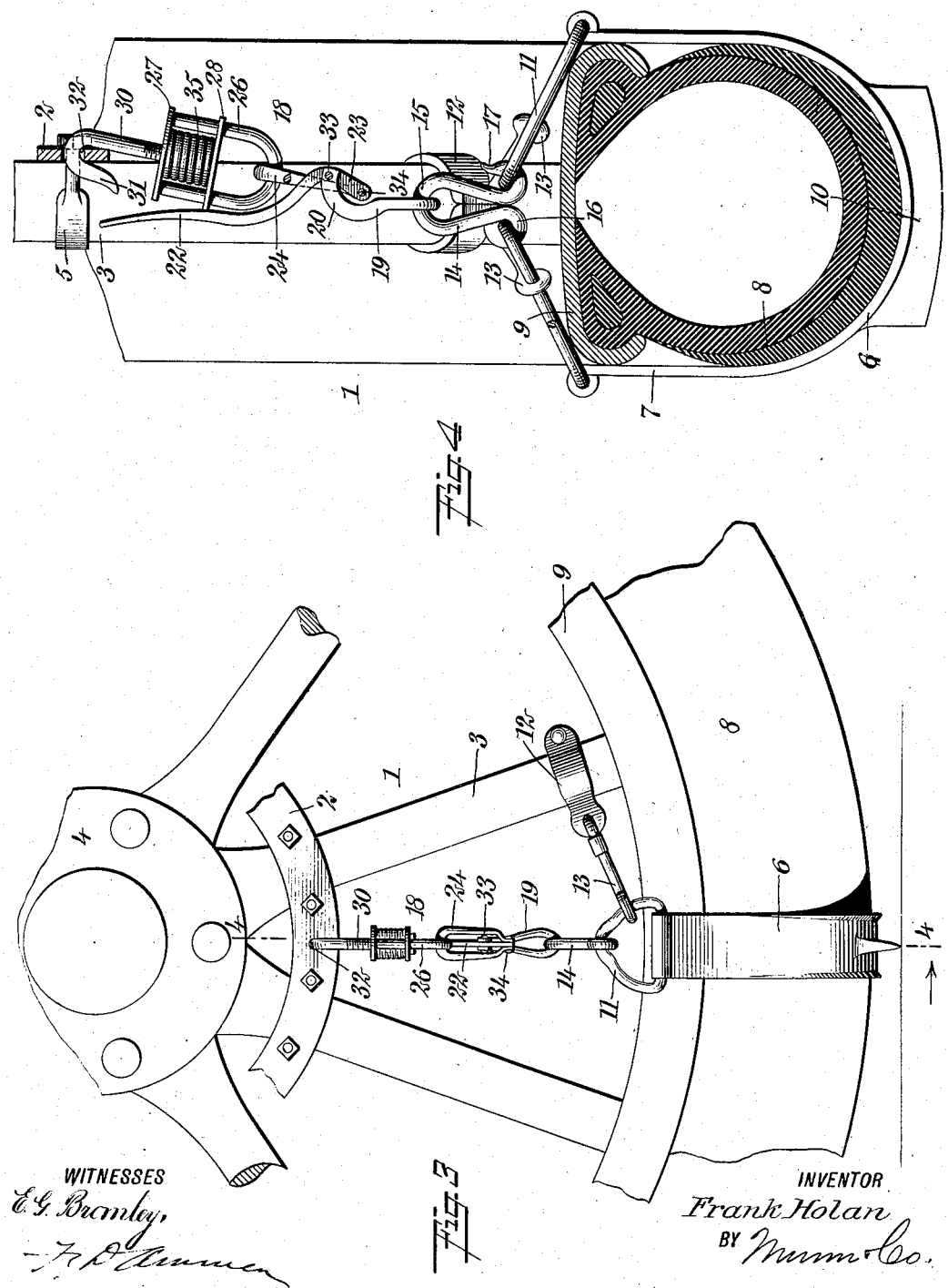
WITNESSES
E. G. Bramley,
INVENTOR
Frank Holan
BY Munn & Co.
ATTORNEYS

UNITED STATES PATENT OFFICE.

FRANK HOLAN, OF NIOBRARA, NEBRASKA.

GRIP-TREAD FOR VEHICLE-WHEELS.

937,528.   Specification of Letters Patent.   Patented Oct. 19, 1909.

Application filed February 2, 1909. Serial No. 475,558.

*To all whom it may concern:*

Be it known that I, FRANK HOLAN, a citizen of the United States, and a resident of Niobrara, in the county of Knox and State of Nebraska, have invented a new and Improved Grip-Tread for Vehicle-Wheels, of which the following is a full, clear, and exact description.

This invention relates to an attachment for the rim of a vehicle wheel for the purpose of enabling it to grip the road-bed.

An object of the invention is to provide a construction for the device which is simple and which can be readily attached when desired to the wheel.

A further object is to construct the device so that it will have a desirable resiliency in the parts which attach it to the wheel.

The device is particularly useful as an attachment for wheels of motor cars or automobiles.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of a wheel to which my invention has been applied; Fig. 2 is a section taken through a part of the mechanism for attaching the device and showing the mechanism in its open or released position; Fig. 3 is a side elevation showing a portion of a wheel, and showing only one of the grip treads, but this view is upon an enlarged scale so as to illustrate the details of construction more fully; and Fig. 4 is a section through the wheel taken on the line 4—4 of Fig. 3, but upon an enlarged scale, and this view illustrates in elevation further the details of the mechanism for attaching the device.

Referring more particularly to the parts, and especially to Fig. 1, 1 represents the wheel of a vehicle, which wheel may be of any usual form, such as that shown. In applying my invention to a wheel of the form shown, I attach a hub ring 2 to the spokes 3 near the hub 4. This hub ring is in the form of a plain flat ring, which is attached to the spokes by U-bolts or clips 5, as indicated most clearly in Fig. 4. At a number of points on the periphery of the wheel, I attach grip collars 6. The construction of these grip collars is most clearly shown in Figs. 3 and 4. Each collar consists of a U-shaped band having legs or straight extensions 7 which project radially inward at the side of the tire 8, the inner ends of these extensions lying against the side edges of the rim 9. The bodies of these collars are curved, as shown, and on their outer sides are provided with blades or dugs 10 which extend transversely of the tire, as shown, and project outwardly from the tire. To the inner extremities of the legs 7, rings 11 are attached, of substantially triangular form. The grip collars are preferably attached between the spokes, as indicated, and are connected with the adjacent spokes which are disposed toward the rear of the wheel with respect to the direction of rotation. In order to connect with the spokes in this way, each of these adjacent spokes is provided with a collar 12, and from this collar, inclined links 13 extend to the rings 11, to which they are attached. As indicated in Fig. 4, the rings 11 incline inwardly and toward the plane of the spokes. The inner ends of these links are connected together by a shackle 14, the form of which is clearly shown in Fig. 4. This shackle is formed at its inner end with a bow or bight 15, and with converging legs. One of these legs is formed into an eye 16 which is permanently attached to one of the rings 11, while the other leg terminates at its inner end in a hook 17 which is detachably connected with the opposite ring 11.

The shackle 14 is connected with the hub ring 2 by a connecting device 18. This connecting device is most clearly illustrated in Fig. 2. It comprises a main link 19, the outer end of which is attached to the bight 15. The inner end of this link 19 is offset laterally so as to form a neck 20, to the outer end of which a lever 21 is pivotally attached. This lever has a long arm 22 and a short laterally bent arm 23, the extremity of which is pivotally attached to an inner link 24. This inner link 24 is attached to a resilient tension device 25. In its construction this device comprises a U-shaped bar 26, the ends of which are attached to a foot plate 27. On the legs of this U-shaped bar 26, a cross head 28 is mounted to slide, said cross head consisting of a plate having a threaded socket 29 on the inner side thereof. In this threaded socket is received the threaded extremity of a stem 30. The body of this stem slides through the plate 27, and the inner extremity of the stem is formed into a hook 31. This hook is adapted to engage in an opening 32 in the hub ring 2, corresponding to the particular grip collar to which it is attached. After the grip collars have been attached to the rim of the wheel and to the spokes, as described above, the connecting device 18 is placed in position so that it connects the shackle 15 with the hub ring. This connecting device is attached in an open position, as shown in Fig. 2, that is, with the lever 22 disposed so as to project outwardly toward the rim of the wheel. After the hook 31 of each device has been attached to the hub ring, the levers 22 are swung inwardly so that the parts come into substantially the position shown in Fig. 4. Referring to this figure, it will be seen that when the levers come to rest the pivot pins 33 which connect them with the links 19 will have moved across the plane of each inner link 24. In other words, if the lever is moved into position from the left, as indicated in Fig. 4, the pivot pin 33 will be disposed on the right-hand side of a line passing through the pin 34 which connects the lever with the inner link 24, which line would pass through the point of engagement between the inner link 24 and the bight of the U-bar 26. In this way the lever locks itself in position, and the tension in the link 19 will tend to swing the lever farther inward instead of pulling it in a releasing direction. This is due, of course, to the offset neck 20 and the offset arm of the lever. In the tension device 18, around the stem 30, a spring 35 is provided, and this spring passes between the foot plate 27 and the cross head 28, tending to force them apart, as indicated in Fig. 2. When the connecting device is applied as described, the shortening of the distance between the shackle 15 and the tension device operates to compress the spring 35. The advantage of this tension device including a spring such as that described, is, that it is not necessary for the length of the attached connecting device to be exactly proportioned to the wheel upon which the device is used; in other words, the spring provides for a certain amount of variation in the distance between the hub ring 2 and the rim of the wheel.

The device as constructed can be applied to a wheel of any ordinary construction. If a wheel is made with the intention of enabling it to have my device applied to it when desired, the brake pumps of the driving wheels will be provided with flanges to which the connecting devices can be attached in the same manner in which they are attached to the hub ring 2. With this device attached to the driving wheel of an automobile it will be evident that the slipping of the rim of the wheel on the road-bed will be overcome, as the dugs 10 will engage the road-bed and give a good grip for the wheel.

I have represented the stems 30 as threaded throughout substantially their entire length. This arrangement enables them if too long, to be cut off the required length to suit the particular wheel to which they are attached. Attention is called to the fact that the sockets 29 are also of substantial length, which arrangement enables the stems 30 to be unscrewed or screwed up, as desired, that is, they give a certain adjustment at this point for the stems.

Having thus described my invention, I claim as new and desire to secure by Letters Patent,—

1. A wheel having a hub ring and a rim, in combination with a plurality of grip collars disposed on the outer side of said rim, a plurality of connecting devices connecting said collars respectively with said ring, said connecting devices each comprising a resilient member, and a lever for placing said resilient member under tension and connected with said resilient member.

2. In combination, a wheel having a rim and a tire on said rim, a member near the hub and rigid with said wheel, a grip collar disposed on said tire, a tension device attached to said member and including a spring adapted to be compressed, an inner link connected with said tension device, an outer link connected with said collar, and a lever connecting said links, said lever and one of said links being offset whereby said lever will lock itself with said spring under compression, the locking movement of said lever affording means for drawing said collar against said tire.

3. In combination, a wheel having a rim and tire, a grip collar on said tire, a tension device comprising a U-bar and a cross head sliding thereupon, a foot plate connecting the legs of said U-bar, a stem sliding through said foot plate and attached to said cross head, a spring surrounding said stem and disposed between said foot plate and said cross head, means for attaching said stem to said wheel, an inner link attached to said U-bar, an outer link attached to said collar, and an offset lever connecting said links and adapted to lock itself when said spring is under compression.

4. In combination, a wheel having a rim and tire, a grip collar on said tire, a U-bar, having parallel legs, a foot plate attached to said legs, a cross head guided on said legs and having a threaded socket, a threaded stem received in said socket and guided through said foot plate, a spring disposed around said stem and tending to thrust said foot plate and said cross head apart, a hook formed at the inner end of said stem, means carried by the wheel for engaging the hook to secure said stem to said wheel, an inner link attached to said U-bar, an outer link attached to said collar, and an offset lever connecting said links adapted to draw said collar toward said tire and also adapted to place said spring under compression when said lever is in its locked position.

5. A wheel having spokes, a rim and a tire, in combination with a grip collar disposed around said tire consisting of a band having extensions extending inwardly at the sides of said rim, rings attached to the ends of said extensions, a collar attached to the spoke adjacent to said grip collar, links connecting said collar with said rings, a shackle permanently attached to one of said rings and having a hook adapted to engage the other of said rings, a hub ring attached to said wheel, a tension device attached to said hub ring, an inner link attached to said tension device, an outer link attached to said shackle, and an offset lever connecting said links and adapted to lock said tension device under tension.

In testimony whereof I have signed my name to this specification in the presence of two subscribing witnesses.

FRANK HOLAN.

Witnesses:
J. D. FORSYTH,
J. F. LEWIS.